United States Patent [19]

Todd et al.

[11] Patent Number: 4,457,882
[45] Date of Patent: Jul. 3, 1984

[54] CENTRIFUGALLY POWERED PELLETIZING MACHINE AND METHOD

[75] Inventors: David B. Todd, Saginaw; James D. Layfield, Bay City, both of Mich.

[73] Assignee: Baker Perkins Inc., Saginaw, Mich.

[21] Appl. No.: 448,976

[22] Filed: Dec. 13, 1982

[51] Int. Cl.³ .............................................. H05B 1/00
[52] U.S. Cl. .................... 264/25; 264/40.6; 264/142; 425/174; 425/232; 425/308; 425/464
[58] Field of Search ........................ 264/25, 40.6, 142; 425/174, 232, 312, 464

[56] References Cited

U.S. PATENT DOCUMENTS 3,483,281 12/1969 Chisholm ................................ 264/25
3,912,799 10/1975 Chisholm ................................ 264/25
4,408,972 10/1983 Casfield ................................ 264/142

*Primary Examiner*—Jay H. Woo
*Attorney, Agent, or Firm*—Learman & McCulloch

[57] ABSTRACT

A centrifugal pelletizer has a hollow electrically and thermally conductive rotor with a series of orifices along its outer rim portion for centrifugally powering strands of heated thermoplastic material from a body of said material in a flowable state within the interior of the rotor. A knife mounted on the frame adjacent the rotor orifices severs the strands into pellets of a predetermined length. A molten material feed tube with fins therein at the exit end to divide the flow extends into a rotor housing to direct flow in a uniform manner to an axially opposite impeller on the rotor and control mechanism, sensitive to the temperature of the rotor adjacent the orifices, controls the supply of current to electromagnets, which have a peripheral magnetic flux conducting plate system extending to and forming a part of the housing creating a flux field which is interrupted by the spinning rotor to induce currents in the rotor which heat it according to the temperature sensed.

22 Claims, 6 Drawing Figures

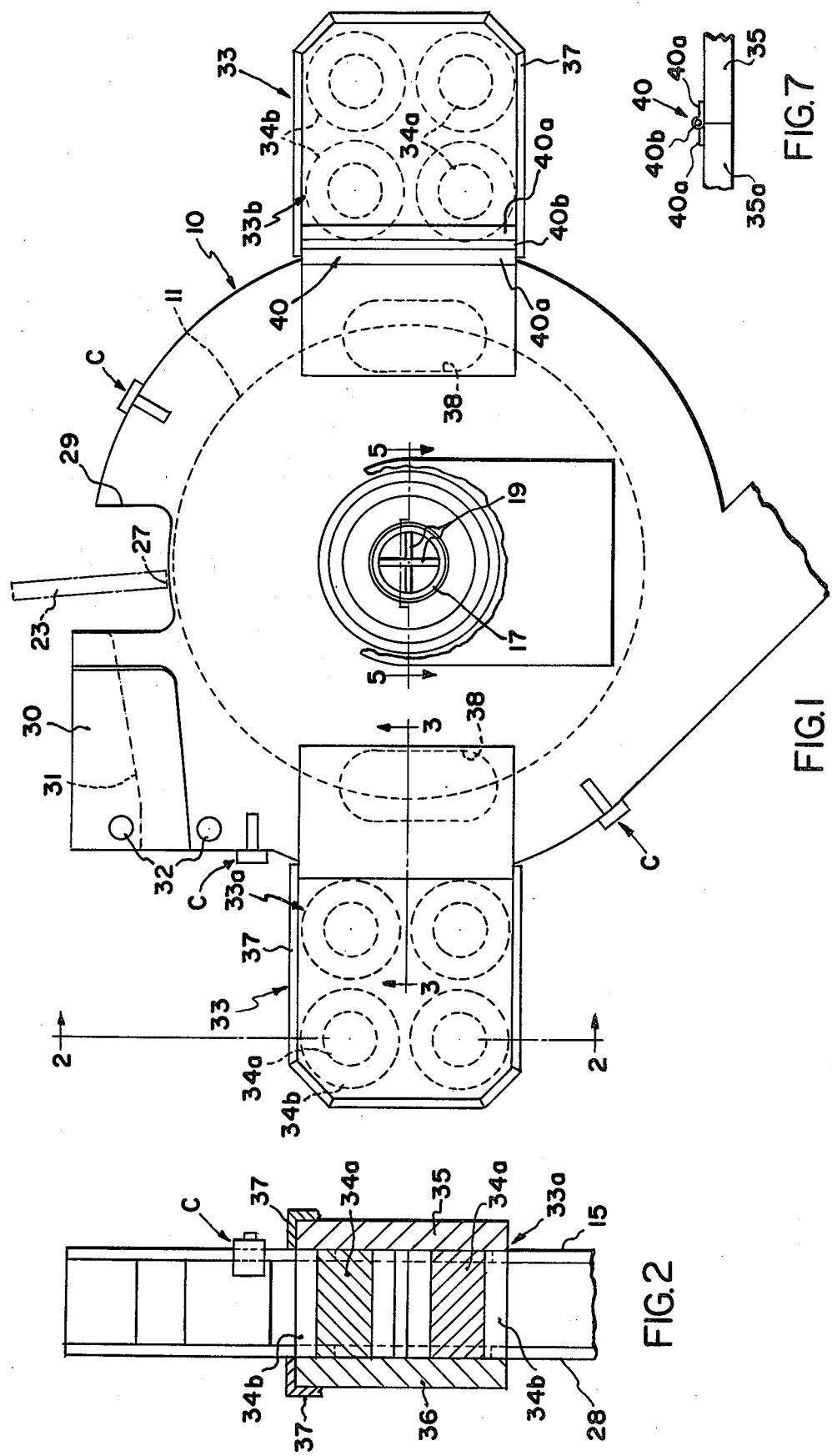

CENTRIFUGALLY POWERED PELLETIZING MACHINE AND METHOD

BACKGROUND OF THE INVENTION

U.S. Pat. No. 4,408,972 was issued Oct. 11, 1983 for an invention entitled "Improvements In Centrifugal Pelletizers and Methods of Centrifugally Pelletizing" by James D. Layfield on behalf of the present assignor, is directed to methods and apparatus for forming pellets of thermoplastic materials, such as polystyrene, polyethylene, polyvinylchloride, and polypropylene, for example. The machine described in the aforementioned application utilizes centrifugal force to extrude the polymer through die holes in a cylindrical rotor die, operating in the range 2000 to 4000 r.p.m., and cuts the polymer strands as they are extruded into pellets which are passed to a quenching water spray.

In the system described, the compounder that incorporates additives into the polymer can increase production, as compared to previous pelletizing machines, without increasing energy consumption, or can reduce energy costs without sacrificing output. For example, a 22 KW unit of the type indicated is capable of the same production rates as a 55 KW extruder/underwater pelletizer, and this power savings become even more pronounced as the capacity of the units is increased.

The present invention is especially directed to improvements in pelletizers of this type wherein the centrifugal head developed in the rotary polymer melt extruder is used to generate the pressure required for extrusion, and the extruder is self-emptying.

In systems of this type, an eddy current heating system can be efficiently and economically employed to add heat to the material and compensate for heat loss.

A prime object of the present invention is to provide an improved feed distribution system to enhance the uniform distribution of the polymer to the rotor and avoid imbalances in feeding which would tend to cause rotor vibration and deleteriously affect the machinery.

Another object of the invention is to provide a more balanced feed system which avoids the transmission of vibration to the cutting blade and keeps the size of the pellets being cut within the proper limits of uniformity which are required.

Still another object of the invention is to provide a magnet powered heating system which utilizes temperature sensors to control the supply of current to the magnets.

Still another object of the invention is to provide a construction which permits quick access to the rotor housing without interfering with the conduction of the magnetic lines of flux.

BRIEF SUMMARY

In accordance with the disclosure which follows, a hollow rotor having radially directed orifices in its peripheral rim portion is mounted for rotation within a housing about a horizontal axis. A sleeve projects coaxially from one side of the rotor outwardly through the adjacent side of the housing and a feed tube, of special construction to uniformly direct the polymer to the rotor, extends into the rotor housing to feed thermoplastic material in a flowable state into the interior of the rotor in a manner to permit it to be accelerated from zero rotational speed to the speed of rotation of the rotor. A severing band device, positioned to direct severed pellets in a path tangential to the rotor into a water spray duct, extends generally parallel to the rotor axis across the path of strands expressed from the rotor orifices to cut pellets from the distal ends of the strands. A magnet powered system, mounted to permit opening of the front cover of the rotor housing to provide ready access to the rotor housing, is provided to heat the rotor, and the rotor temperature is continuously sensed to control current supply to the magnets and achieve the desired rotor temperature necessary to maintaining the particular polymer at its optimum extrusion temperature.

Other objects and advantages of the invention will be pointed out specifically or will become apparent from the following description when it is considered in conjunction with the appended claims and the accompanying drawings in which:

FIG. 1 is a front, side elevational view with certain parts broken away, omitted, or shown in section for the sake of convenience;

FIG. 2 is a sectional end elevational view taken on the line 2—2 of FIG. 1 on an enlarged scale;

FIG. 7 is a fragmentary plan view portraying a hinge mounting for the rotor housing cover.

GENERAL DESCRIPTION

It is to be understood that the aforementioned U.S. patent, which we incorporate herein by reference, provides an excellent description of a machine of the type to which the present improvements are directed, and that description will not be repeated in detail. Attention is, first of all, directed to FIGS. 1 and 6 hereof. The invention is concerned with a housing generally designated 10, within which a cooled rotor shaft is mounted, and on which a hollow rotor 11 is mounted to be driven by a suitable electric motor or the like at speeds preferably on the order of about 2000 to 4000 r.p.m. The rotor 11, as in the application mentioned, includes a plurality of radially directed polymer strand expressing orifices 12, opening from the interior of the rotor through the rotor rim 13.

Figure 6:
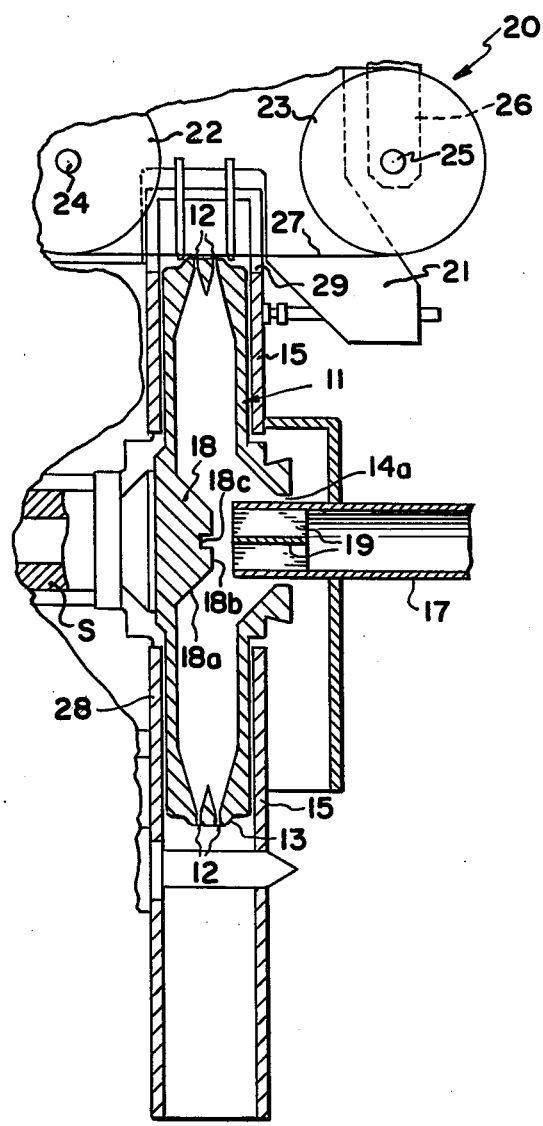
FIG. 6 is a sectional fragmentary side elevational view through the rotor housing.

As FIG. 6 particularly indicates, at the side of the rotor 11, opposite its coupling to shaft S, a hollow sleeve 14 extends axially outwardly from the rotor side wall beyond the adjacent side wall 15 of housing 10, sleeve 14 passing freely through an opening 16 in the rotor housing side wall 15, which is mounted to be separable from the remainder of the housing so that it can function as a cover plate. Rotor sleeve 14 is formed with a central opening 14a, into which a stationary feed tube 17 may be inserted with clearance, to feed a hot and fluid thermoplastic material at a predetermined velocity or feed rate into the hollow interior of rotor 11 opposite an impeller 18 having a flared annular surface 18a, and a front face 18b broken by communicating slots 18c extending radially at 90° intervals to form impellers which help to accelerate the flow from the zero r.p.m.

at which the polymer is received, to the speed of rotation of rotor 11.

Provided within tube 17 are fins 19, cruciformly arranged in the embodiment shown, which are of a length, at the outlet of pipe 17, about one pipe diameter long. While the cruciform arrangement of fins 19 is presently preferred, it is also thought that other useful divisions might be 3, 5, 6, or 8.

Figure 5:
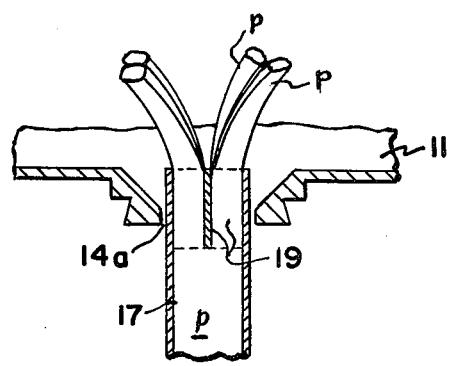
FIG. 5 is an enlarged sectional plan view taken on the line 5—5 of FIG. 1 and illustrating the manner in which the flow of polymer to the rotor housing is controlled to provide a balanced flow.

The dividing fins 19 divide and divert the flow in the manner indicated in FIG. 5 in a uniform angular manner to avoid the creation of imbalances which would tend to cause the rotor 11 to vibrate. Without fins 19, the approximately parabolic flow rofile of polymer down the feed tube 17, caused by the fact that the velocity is much higher at the center than at the wall, tends to prevent the divergence of undivided flows, and this also is a problem if the fins 19 are too long.

With rotation of rotor 11, thermoplastic material heated to a flowable state and thence fed from tube 17 in divergent flow paths against the protrusion 18, is directed and impelled radially, and then centrifugally expressed from the interior of rotor 11 through orifices 12. The strands are, as previously, converted into pellets by a severing device generally designated 20 of the same type as in the aforementioned application. The severing device 20 may include a bracket 21, upon which a pair of pulleys 22 and 23 are supported for rotation. The pulley 22 may be a driven pulley mounted upon the shaft 24 of a drive motor whose housing is fixedly mounted upon the bracket 21. Idler pulley 23 is mounted for free rotation about a shaft 25, carried on an arm 26 mounted on bracket 21, and an endless severing band 27 (which may be constructed of thin spring steel in the range 0.1 to 1.0 mm. in thickness) is trained about pulleys 22 and 23 to be driven continuously in an endless path of travel. As FIG. 6 indicates, the lower run of endless band 27 extends generally parallelly to the axis of rotor 11 and is located to extend transversely across the path of movement of the strands of plastic expressed from the rotor orifices 12.

Still referring to FIG. 6, it is seen that housing 10 includes rotor housing side plates 15 and 28, which are spaced from rotor 11 with but a slight axial clearance. The circumferential portion 28a (FIG. 3) of housing 10 is, however, spaced a substantial distnace from the periphery of rotor 11 to allow for a substantial radial growth and projection of strands from the rotor orifices 12 and provide a chamber C between wall 28a and the rotor 11. As previously, the rotor housing is formed with an opening 29 (FIG. 1) to permit movement of the band 27 and band assembly into and out of operative relationship with the rotor 11.

Member 30, which forms a continuation of rotor housing 10, comprises a pellet-passing and quenching water spray duct for receiving pellets which are severed by the band 27 and conducting them via passage 31, through a further cooling and coolant conducting system (not shown). Pellets severed by the band 27 continue in straight line motion, in a path that is generally tangential to rotor 11, and pass into the passage 31 which has coolant spray ports 32 provided therein.

It is necessary that the rotor 11 be heated to bring it up to the temperature desirable for extrusion and pelletizing of the particular thermoplastic material being processed, and this heating must be maintained to offset heat losses from the rotor to its surroundings to maintain the die cappilaries at a temperature high enough to prevent solidification of the polymer being processed, and to transfer heat to the polymer being fed, if it is not at a high enough temperature for processing. Chisholm U.S. Pat. No. 3,483,281, issued Dec. 9, 1969, discloses an eddy current heating system for accomplishing this, and the system to be described herein incorporates certain patentable improvements which greatly enhance the practicality of such a system.

As FIGS. 1 and 2 disclose, electromagnet assemblies 33, generally designated 33a and 33b, are provided at each side of the pelletizing machine, supported on rotor housing 10 in opposed alignment. Each assembly 33 includes, in the embodiment shown, a complement of preferably four electromagnets 34, comprising, as usual, iron cores 34a surrounded by field windings 34b. Each magnet assembly 33 further includes front and back magnetic field connecting plates 35 and 36 respectively, which are encased within a relatively non-conductive casing generally designated 37.

As FIG. 3 indicates, the magnet plate 36 extends sufficiently inwardly to overlie the peripheral end of rotor housing 10, while the plate 35 is split as at 35', for a purpose which will later be described, and has an abutting extension portion 35a.

The plates or arms 35–35a and 36 are made up of very high magnetic permeability material, such as steel or iron. The cover 37 and rotor housing 10, however, are constructed of a relatively low permeability material, such as aluminum or 300 Series stainless steel. Provided in slots 38, cut in the housing side walls 15 and 28, are flux plates 39 which have contact with the magnet plates 35–35a and 36, and which lie in close proximity, i.e., within less than 3 mm., to the spinning rotor which itself is constructed of steel of high magnetic conductivity. In view of this proximity, we avoid the diminishing of the flux intensity across the air gaps and, because the housing 10 is constructed of a low permeability material, magnetic lines of force do not short circuit across the housing 10. Rather, they create eddy currents within the spinning rotor 11 which causes the rotor 11 to heat to the desired temperature when a direct current of a predetermined controlled amperage is applied to the winding coils 34b, in each of the assemblies 33a and 33b.

Figure 3:
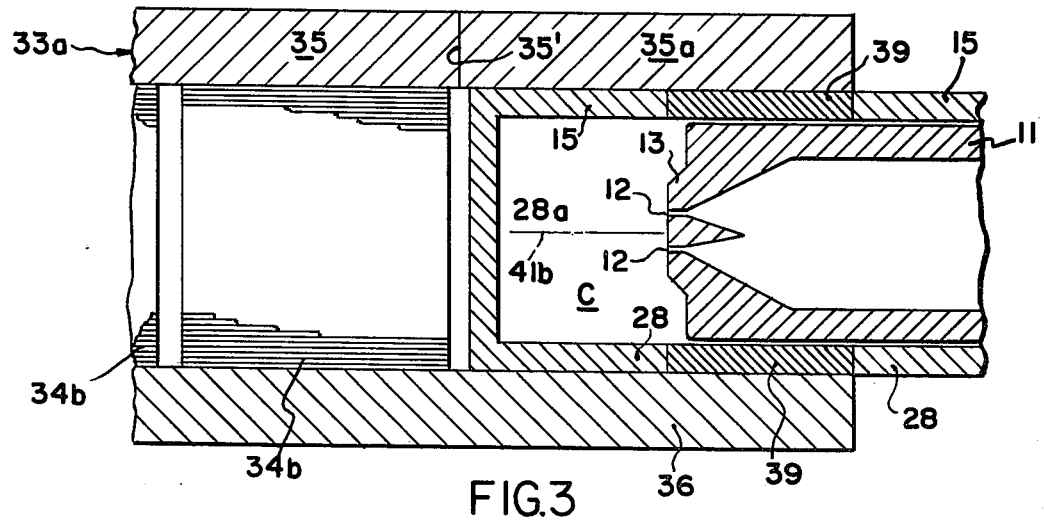
FIG. 3 is a greatly enlarged, inverse plan sectional view taken on the line 3—3 of FIG. 1.

FIGS. 2 and 3 are sections through the magnet assembly 33a. It is to be understood that the magnet assembly 33b is identical, except that the magnet plates 35 and 35a are connected by a hinge 40, comprising plates 40a connected by a hinge pin 40b. With assemblies 33a and 33b being so constructed, the front wall 15 of rotor housing 10 can be pivoted outwardly about the hinge pin 40b to provide ready access to the rotor when the pelletizing operation has finished and it is desired to have access to the interior of the rotor.

Normally commercially available toggle clamps, generally designated C, of a readily releasable variety, are provided for securing the cover 15 securely in place. This ready accessibility facilitates maintenance, cleaning, and whatever is necessary in the way of changing parts, or replacement thereof. Because the magnet assemblies are housing supported in the manner indicated, they do not create interference with either the feed supply or spindle support systems.

The electromagnets in assembly 33a provide a magnetic field of one polarity, while the electromagnets in assembly 33b provide an electromagnetic field of opposite polarity, since it is necessary from a practical point of view that the spinning rotor pass through magnetic fields of opposite polarity. This is accomplished by winding the coils in opposite directions at the 33a and 33b locations to create a different north-south pole arrangement at each location. Since the amount of heat generated within the spinning rotor 11 is dependent upon the number of lines of force being cut by the rotor and the flux is controlled by the current in the magnet coil windings 34b, a control of the rotor die temperature can be provided by sensing the temperature of the rotor via an infra red wave length radiation measuring optical pyrometer, and using the signal generated to control current flow to the coils 34b.

Figure 4:
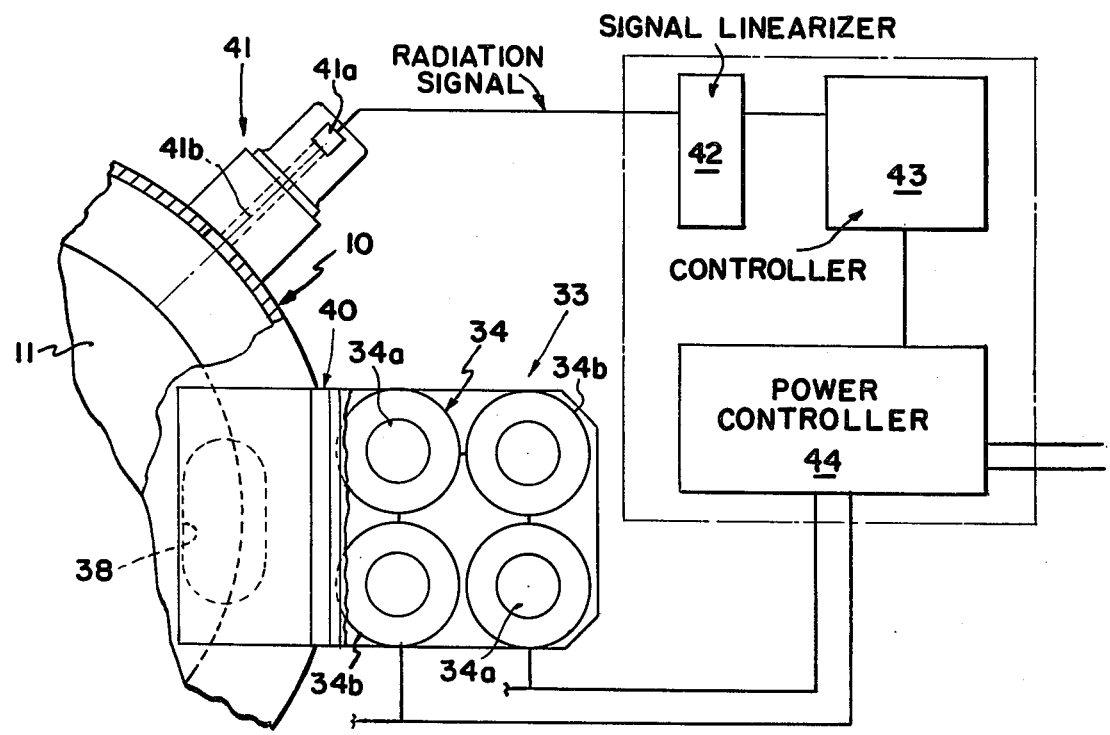
FIG. 4 is a schematic view illustrating a control system for the magnets which provide heat and maintain the desired temperature of the spinning rotor.

In FIG. 4 this commercially available, non-contact radiation sensor device is shown generally at 41, secured to the rotor housing wall 28. The lens system 41a of the device provides single lens reflex focusing along a line of sight at 41b which is shown also in FIG. 3 as directed at the rim of rotor 11 between the rows of orifices 12. It is control of the temperatures of the walls of the orifices 12 along their length which is important to provide a properly flowing polymer which does not plug the orifices, and yet, is not overheated. The sensor head focusses on a small spot adjacent the orifices 12, i.e., in the neighborhood of ½ inch diameter, and is preferably sensitive to a narrow band of radiation which it integrates to an average temperature over a time period (see FIG. 4). The sensing head 40 may be a commercially available Capintech/Heimann model obtainable from Capintec Instruments, Inc., of Ramsey, N.J., U.S.A., or Ray-O-Tube ® unit obtainable from Leeds and Northrup Company of North Wales, Pa., U.S.A., or a unit obtained from Ircon Company of Skokie, Ill., U.S.A. The pryometer electrically connects to a commercially available signal converter 42, such as a unit obtainable from Capintech, or the Leeds and Northrup linearizer, or an Ircon indicator unit, which converts its output signal to a linear scale temperature signal, having a DC millivolt output.

In the linearizer, the signal from the sensor is amplified, compensated for the emissivity factor, and converted to binary form. The binary signal is the input to a microprocessor that linearizes the measurement and performs the computation necessary for the averaging and peak picking. The results of this computation can be displayed in temperature units and in the present system are sent to output circuits.

A current-adjusting type temperature controller 43 such as the Leeds and Northrup Electromax V, or Ircon's proportional controller, is electrically connected with the signal converter 42 to compare the actual (input) signal with a signal representing temperature which is preset on controller 43 and provide a "differential" output signal. Then this signal is in turn fed to a DC power controller 44, which modulates the current supply flowing to the electromagnets. The power controller, which provides the controlled current DC output to the field coils 34b from a suitable line power source may be the Model 64600 Phaser power controller manufactured commercially by Research, Inc. of Minneapolis, Minn., U.S.A. All of the units 41, 42, 43 and 44 are commercially available, and require no further recitation of their construction or operation than stated herein.

Briefly, the pyrometer generates an electronic output signal which is dependent on the heat radiation sensed. This non-linear signal output is then converted to a linear temperature signal by the signal converter 42, which has a millivolt output. The millivolt output signal is then supplied to the temperature controller which, in turn, provides a milliamp direct current control signal, and it is this signal which outputs to the power controller 44 to modulate the supply of current to the magnet coils.

It is to be understood that the drawings and descriptive matter are in all cases to be interpreted as merely illustrative of the principles of the invention, rathern than as limiting the same in any way, since it is contemplated that various changes may be made in various elements to achieve like results without departing from the spirit of the invention or the scope of the appended claims.

We claim:

1. In a method for forming pellets of theroplastic material by centrifugally expressing strands of flowable thermoplastic material from orifices in the rim portion of a rotating hollow rotor bounded radially by a housing chamber, and severing said strands at a selected location adjacent the periphery of said rotor to form pellets; the steps of
   a. providing a feed tube having an exit end which communicates with the rotating hollow rotor generally axially to deliver the thermoplastic material to the rotor;
   b. dividing the outflow in the exit end of the tube into a plurality of radially diverging streams which uniformly distribute the flow to the rotor;
   c. accelerating the streams to approximately the speed of rotation of the rotor;
   d. positioning a cutter in the chamber across the path of rotation of portions of the strands which have extruded from the rotor and are carried with the rotor in the path of revolution thereof; and
   e. receiving and cooling the pellets severed from said strands before they agglomerate.

2. The subject matter of claim 1 in which the flow is subdivided in the distal end of the feed tube.

3. A method for forming pellets of thermoplastic material by centrifugally expressing strands of flowable thermoplastic material from orifices in the rim portion of a rotating hollow rotor bounded radially by a housing chamber, and severing said strands at a selected location adjacent the periphery of the rotor to form pellets, comprising:
   a. delivering the plastic material to the rotating hollow rotor generally centrally and accelerating the material to approximately the speed of rotation of the rotor while moving it radially in the rotor to the orifices;
   b. expressing strands of the plastic material from said orifices and severing them to form pellets; and
   c. continually sensing the temperature of said rotor via a sensor and supplying heat to said rotor in accordance with the temperature sensed to maintain the temperature of the rotor at the orifices at a predetermined value for the material being pelletized.

4. The method of claim 3 in which heat is supplied to said rotor via direct current powered magnets and the creation of magnetic flux fields of opposite polarity which embrance the rim of the rotor at opposite sides of the rotor, which said rotor cuts in its rotary path to induce the flow of heating eddy currents in said rotor, and the control of direct current to said magnets is controlled by said sensor.

5. The method defined in claim 4 in which said sensor is sensitive to a restricted band of radiant heat, and a signal from the sensor is compared with a predetermined value to control the amperage of the direct current creating the flux fields.

6. The method of claim 3 wherein said sensor monitors the heat radiated from a spot on said rotor adjacent said orfices.

7. An improved centrifugal pelletizer for forming pellets from thermoplastic material including:
(a) a frame;
(b) a hollow rotor journaled for rotation about an axis by said frame, the rotor being disc-like and having a series of orifices along its outer rim portion for centrifugally expressing strands of heated thermoplastic material from a body of said material in a flowable state within the interior of said rotor, upon rotation of said rotor;
(c) a knife mounted on said frame adjacent said rotor orifices for severing said strands into pellets of a predetermined length;
(d) a non-rotary housing for said rotor incorporated with said frame and having side walls generally parallel to the rotor sides, and a peripheral wall;
(e) a cooling and collecting duct for receiving pellets cut by the knife communicating with said housing;
(f) means for driving said rotor at a selected rate of rotation relative to said knife;
(g) said rotor having an axially extending material directing and accelerating impeller portion on one side thereof and an opposite side wall of the rotor having an opening axially opposite said impeller portion;
(h) an axially extending molten material feed tube extending to said opening to direct flow therefrom to said impeller portion; and
(i) fin means in the exit end of said feed tube dividing the interior thereof into a plurality of segments of predetermined axial length which divide the flow into a plurality of outwardly diverging streams which impinge against said impeller portion.

8. The improved pelletizer of claim 7 wherein said fin means is at least about one tube diameter in length.

9. The improved pelletizer of claim 7 wherein said impeller is divided into four segments and said fin means is cruciform in configuration.

10. An improved centrifugal pelletizer for forming pellets from thermoplastic material including:
(a) a frame;
(b) a hollow-electrically and thermally conducttive rotor journaled for rotation by the frame, the rotor being disc-like and having a series of orifices along its outer rim portion for centrifugally expressing strands of heated thermoplastic material from a body of said material in a flowable state within the interior of said rotor, upon rotation of said rotor;
(c) a knife mounted on said frame adjacent said rotor orifices for severing said strands into pellets of a predetermined length;
(d) a non-rotary housing for said rotor incorporated with said frame and having side walls, formed generally of a material having low magnetic field conductivity, generally parallel to the rotor sides with portions spaced closely thereto, and a peripheral wall;
(e) a cooling and collecting duct communicating with the housing for receiving pellets cut by the knife;
(f) means for driving said rotor at a selected rate of rotation relative to said knife;
(g) one side wall of the rotor having an opening, and a molten material feed tube extending thereto to supply material to the rotor;
(h) electromagnet means supported by the frame peripherally adjacent to, but outwardly of, the rotor; and
(i) a magnetic flux conducting plate system magnetically connecting with the electromagnet means and having a portion extending into and forming a portion of the side wall of said housing such as to overlie the side of said rotor at a closely spaced distance therefrom such as to induce electrical currents in the rotating which heat the rotor.

11. The improved pelletizer of claim 10 wherein said rotor housing has still additional restricted portions of its side walls at the periphery thereof formed of magnetic flux conducting material constituting a portion of said plate system, and the balance of the rotor housing is formed of a material having low magnetic field conductivity.

12. The improved pelletizer of claim 10 wherein said electromagnet means includes electromagnets in diametrally opposed relation at opposite sides of said rotor housing with a separate such plate system for each; and means is provided for supplying direct current to said electromagnets such as to create magnetic fields of fixed opposite polarity at opposite sides of the rotor housing.

13. The improved pelletizer of claim 10 wherein one side wall of said rotor housing is separable from the other and said plate system includes abutting magnet plate sections which allow removal of a plate section with the removable side wall.

14. The improved pelletizer of claim 7 wherein said electromagnet means includes electromagnets in diametrally opposed relation at opposite sides of said rotor housing with a separate such plate section for each, the other such plate system also including abutting magnet plate sections which are hingedly connected to serve as a hinge support for said separable side wall of the rotor housing.

15. The improved pelletizer of claim 10 wherein said separable side wall of the rotor housing is open to receive the axially extending molten material feed tube which extends to supply material to the rotor; and fin means of predetermined axial length is provided in the exit end of said feed tube to divide the interior thereof into a plurality of segments which divide and diverge the flow stream.

16. The improved pelletizer of claim 10 in which there is a supply of DC power to said electromagnet means; sensing means monitors the temperature of said rotor at a location adjacent said orifices; and means controlled by said temperature sensing means varies the amperage of said DC power source.

17. The improved pelletizer of claim 12 in which there is a controlled supply of DC power to said electromagnets; optically focussed heat radiation sensing and control means continually senses the temperature of the rotor surface at a location immediately adjacent said orifices to accurately monitor the temperature of the orifice walls over a period of time to obtain an average temperature thereof; controller means continually compares said average temperature with a predetermined temperature; and controller means continually varies the output of a DC power source in accordance with the differential temperature to continually increase or decrease its amperage proportionately to the extent of the differential temperature, and increase or decrease the amperage of the DC power supplied to said electromagnets.

18. The improved pelletizer of claim 17 in which said sensing and control means includes means for converting its signal to a linear temperature scale output signal.

19. An improved centrifugal pelletizer for forming pellets from thermoplastic material including:
   (a) a frame;
   (b) a hollow thermally conductive rotor journaled for rotation by the frame, the rotor being disc-like and having a series of orifices along its outer rim portion for centrifugally expressing strands of heated thermoplastic material from a body of said material in a flowable state within the interior of said rotor, upon rotation of said rotor;
   (c) a knife mounted on said frame adjacent said rotor orifices for severing said strands into pellets of a predetermined length;
   (d) a non-rotary housing for said rotor mounted on said frame and having radial side walls generally parallel to the rotor sides, and a peripheral wall spaced radially from the rim;
   (e) a cooling and collecting duct communicating with the housing for receiving pellets cut by the knife;
   (f) means for driving said rotor at a selected rate of rotation relative to said knife;
   (g) means for supplying a polymer material to said rotor;
   (h) heating means for introducing heat to said rotor;
   (i) means monitoring the temperature of the rotor adjacent the orifices; and
   (j) means for controlling the heating means connected with the monitoring means and supplying more or less heat to the rotor in accordance with the temperature sensed by the monitoring means.

20. The improved pelletizer of claim 19 wherein said heating means comprises electromagnets with magnetic field conducting plates in close proximity to said rotor to induce current flow therein which heats said rotor; said orifices are arranged in at least a pair of circular rows; and said sensing means includes a focused heat radiation senser monitoring heat radiated from a spot adjacent said orifices.

21. An improved centrifugal pelletizer for forming pellets from thermoplastic material including:
   (a) a frame;
   (b) a hollow-electrically and thermally conductive rotor journaled for rotation by the frame, the rotor being disc-like and having a series of orifices along its outer rim portion for centrifugally expressing strands of heated thermoplastic material from a body of said material in a flowable state within the interior of said rotor, upon rotation of said rotor;
   (c) a knife mounted on said frame adjacent said rotor orifices for severing said strands into pellets of a predetermined length;
   (d) a non-rotary housing for said rotor incorporated with said frame and having front and rear side walls generally parallel to the rotor sides with portions spaced closely thereto, and a peripheral wall, the front wall being releasably secured to the remainder of said housing;
   (e) a cooling and collecting duct communicating with the housing for receiving pellets cut by the knife;
   (f) means for driving said rotor at a selected rate of rotation relative to said knife;
   (g) one side wall of the rotor having an opening, and an axially extending molten material feed tube extending thereto to supply material to the rotor;
   (h) electromagnet means supported by the frame peripherally outwardly of the housing at opposite sides thereof; and
   (i) a magnetic flux conducting plate system magnetically connecting with the electromagnet means at at least one side of the housing and extending to overlie the side surface of said housing such as to induce electrical currents in the rotating rotor which heat the rotor, said plate system comprising a pair of abutting plate sections, one plate section being supported perimetrally outward of said housing by the frame, and the other section being supported by the front wall of the housing such as to conduct magnetic flux while allowing separation of the front wall of the housing, with the plate section supported thereby, to obtain access to said rotor.

22. The improved pelletizer of claim 1 wherein a pair of such plate systems are provided in substantially 180° opposed relation on opposite sides of said housing; and the abutting sections at one side are connected by a hinge.

* * * * *

UNITED STATES PATENT AND TRADEMARK OFFICE
CERTIFICATE OF CORRECTION

PATENT NO. : 4,457,882

DATED : July 3, 1984

INVENTOR(S) : David B. Todd et al

It is certified that error appears in the above-identified patent and that said Letters Patent are hereby corrected as shown below:

Column 3, line 13, change "rofile" to -- profile --.

Column 8, line 13, after "rotating" insert -- rotor --.

Signed and Sealed this

Twentieth Day of November 1984

[SEAL]

Attest:

GERALD J. MOSSINGHOFF

Attesting Officer

Commissioner of Patents and Trademarks